(12) United States Patent
Tsukamoto (10) Patent No.: US 7,892,675 B1
(45) Date of Patent: Feb. 22, 2011

(54) ELECTROCHEMICAL DEVICE HAVING ULTRASONIC WELD ATTACHING WELD MATERIAL TO ELECTRODE TAB

(75) Inventor: Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 11 days.

(21) Appl. No.: 11/634,652

(22) Filed: Dec. 6, 2006

(51) Int. Cl.
*H01M 4/02* (2006.01)
*H01M 4/04* (2006.01)
*H01M 2/02* (2006.01)
*H01M 2/00* (2006.01)

(52) U.S. Cl. .................. 429/211; 429/209; 429/170; 429/171; 429/174

(58) Field of Classification Search .................. None
See application file for complete search history.

(56) References Cited

U.S. PATENT DOCUMENTS

| | | | | |
|---|---|---|---|---|
| 5,580,679 | A | * | 12/1996 | Tanaka ........................ 429/185 |
| 6,458,485 | B2 | * | 10/2002 | Yanai et al. ................. 429/211 |
| 6,797,429 | B1 | * | 9/2004 | Komatsu ..................... 429/163 |
| 7,276,313 | B2 | * | 10/2007 | Watanabe et al. ........... 429/159 |
| 2003/0091893 | A1 | * | 5/2003 | Kishiyama et al. ............ 429/94 |

* cited by examiner

*Primary Examiner*—Dah-Wei Yuan
*Assistant Examiner*—Angela J. Martin
(74) *Attorney, Agent, or Firm*—Gavrilovich, Dodd & Lindsey, LLP (57) ABSTRACT

An electrochemical device has one or more electrodes in electrical communication with a tab assembly. The tab assembly includes an ultrasonic weld bonding one or more weld materials to a tab extending from the one or more electrodes.

33 Claims, 7 Drawing Sheets

ELECTROCHEMICAL DEVICE HAVING ULTRASONIC WELD ATTACHING WELD MATERIAL TO ELECTRODE TAB

STATEMENT REGARDING FEDERALLY SPONSORED RESEARCH OR DEVELOPMENT

This invention was made with United States Government support under contract W15P7-05-C-P212 awarded by the U.S. Army Communications-Electronic Research & Engineering Center. The United States Government has certain rights in this invention.

FIELD

The present invention relates to electrochemical devices, and more particularly to a battery employing an electrode with a tab.

BACKGROUND

A variety of batteries employ one or more electrodes having a tab extending from a substrate. The tab is often made from a foil of a lightweight material such as aluminum foil. However, aluminum foil is often not sturdy enough to survive battery assembly, handling and/or certain applications where vibration and/or shock occurs. As a result, there is a need for an improved electrode tab.

SUMMARY

An electrochemical device has one or more electrodes in electrical communication with a tab assembly. The tab assembly includes an ultrasonic weld bonding one or more weld materials to a tab extending from the one or more electrodes. The tab can include aluminum and weld material can include one or more components selected from a group consisting of Nickel and Stainless Steel.

A method of generating an electrochemical device includes ultrasound welding a weld material to a tab. The method also includes positioning one or more electrodes in a case. The one or more electrodes are attached to the tab such that at least a portion of the weld material is positioned outside of the case.

BRIEF DESCRIPTION OF THE FIGURES

FIG. 1A and FIG. 1B illustrate a tab assembly having a tab attached to a weld material.

FIG. 2A and FIG. 2B illustrate a tab assembly having a tab attached to a weld material.

FIG. 4A and FIG. 4B illustrate a tab assembly having a tab attached to a weld material.

FIG. 5A and FIG. 5B illustrate an electrode including the tab assembly.

FIG. 6A through FIG. 6C illustrate a pouch cell that employs a tab assembly.

DESCRIPTION

An electrochemical device such as a battery or capacitor is disclosed with one or more electrodes having an active material positioned on a substrate. The substrate includes a tab extending from a substrate body. At least a portion of the tab includes a weld material that serves as a supporting material. The weld material provides the tab with the mechanical strength required to survive battery assembly, handling and/or certain applications where vibration and/or shock occurs. In some instances, the weld material is suitable for welding to other materials during assembly of the battery. Additionally, the weld material can be positioned on only a portion of the tab and need not be positioned on the substrate body. As a result, the weld material need not affect the substrate body. An ultrasound weld can be employed to attach the weld material to the tab. In contrast with other methods of attaching materials, ultrasound welding allows weld materials to be bonded to lightweight materials such as foils without damaging these materials. Additionally, ultrasound welding can eliminate the need for additional processing such as calendaring after attachment of the weld material to the tab.

Figure 1A:
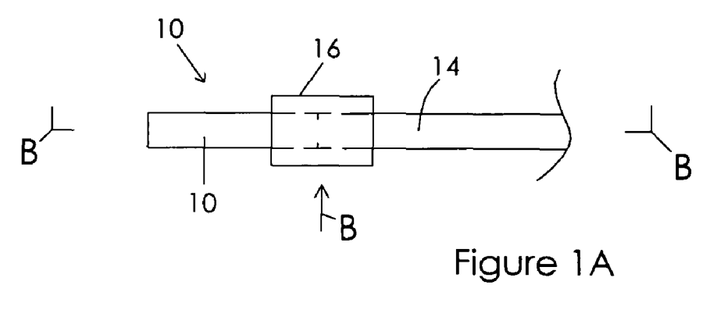
FIG. 1A is a sideview of the tab assembly.
Figure 1B:
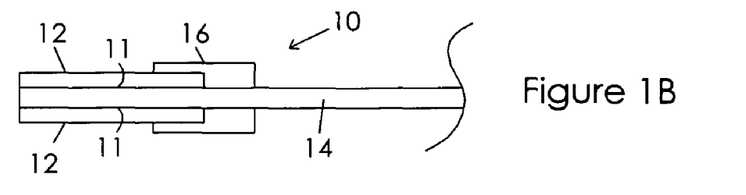
FIG. 1B is a cross-section of the tab assembly taken along a line extending between the brackets labeled B in FIG. 1A and looking in the direction of the arrow labeled B in FIG. 1A.

FIG. 1A is a sideview of a tab assembly 10. FIG. 1B is a cross-section of the tab assembly 10 taken along a line extending between the brackets labeled B in FIG. 1A and taken looking in the direction of the arrow labeled B in FIG. 1A. The tab assembly 10 includes an ultrasound weld 11 attaching a weld material 12 to a tab 14.

The tab assembly optionally includes a sealing medium 16 positioned on the tab 14 and on the weld material 12. As will be described in more detail below, the sealing medium can provide a seal between the tab assembly and a battery case such as the pouch of a pouch cell. The dashed lines in FIG. 1A illustrates the location of the weld material 12 and the tab 14 under the sealing medium 16. The weld material 12 can be positioned on the entire tab 14 but can also be positioned on a portion of the tab 14. The sealing medium 16 can be positioned so as to cover the intersection between the weld material 12 and the tab 14 as is evident in FIG. 1A. Accordingly, the sealing medium 16 can be positioned in contact with both the weld material 12 and the tab 14. The sealing medium is preferably positioned such that the weld material is not exposed to electrolyte in the interior of an electrochemical device. Accordingly, when a portion of the weld material is located inside of the electrochemical device, the sealing medium can be positioned such that the sealing medium covers the portion of the weld material located in the interior of the electrochemical device. In some instance, the sealing medium is not positioned on or over any portion of the weld medium and the sealing medium is positioning medium such that the weld material is not exposed to electrolyte in an electrochemical device. Positioning the sealing medium such that the weld material is not exposed to electrolyte in an electrochemical device allows materials that are unstable in the presence of the electrolyte to be employed. For instance, the weld material can be nickel.

Figure 2A:
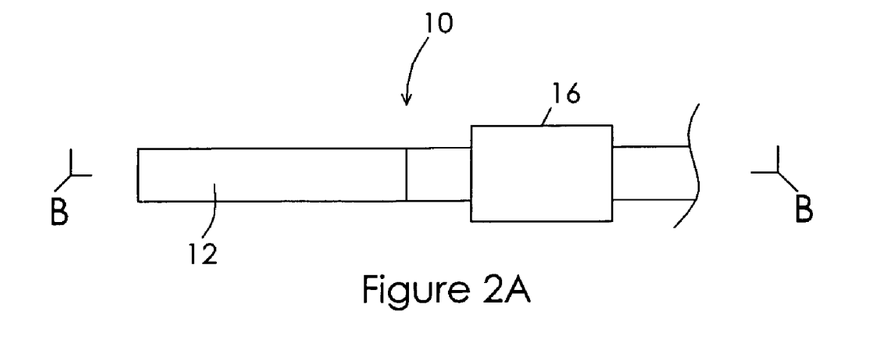
FIG. 2A is a sideview of the tab assembly.
Figure 2B:
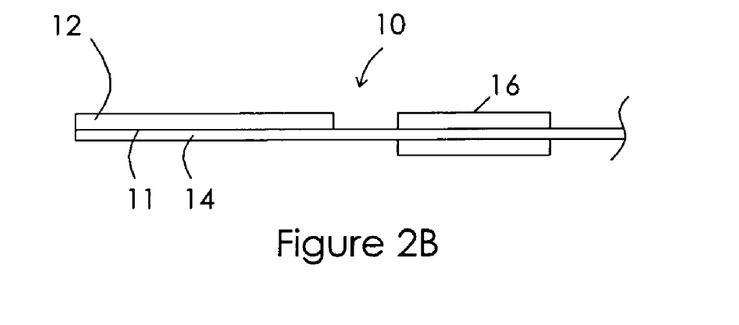
FIG. 2B is a cross-section of the tab assembly taken along a line extending between the brackets labeled B in FIG. 2A and looking in the direction of the arrow labeled B in FIG. 2A.

Although the weld material 12 is shown as positioned on both side of the tab 14, the weld material 12 can be positioned on one side of the tab 14. For instance, FIG. 2A and FIG. 2B illustrate a tab assembly having the weld 12 material positioned on a single side of the tab 14. FIG. 2A is a sideview of the tab assembly 10 and FIG. 2B is a cross-section of the tab assembly 10 taken along a line extending between the brackets labeled B in FIG. 2A and taken looking in the direction of the arrow labeled B in FIG. 2A. The sealing medium illustrated in FIG. 2A and FIG. 2B is not positioned over an intersection between the tab and the weld material. For instance, no portion of the weld material is covered by the sealing medium. As will become evident below, this embodiment of the tab assembly causes the entire weld material to be located outside of the interior of the electrochemical device.

Figure 3:
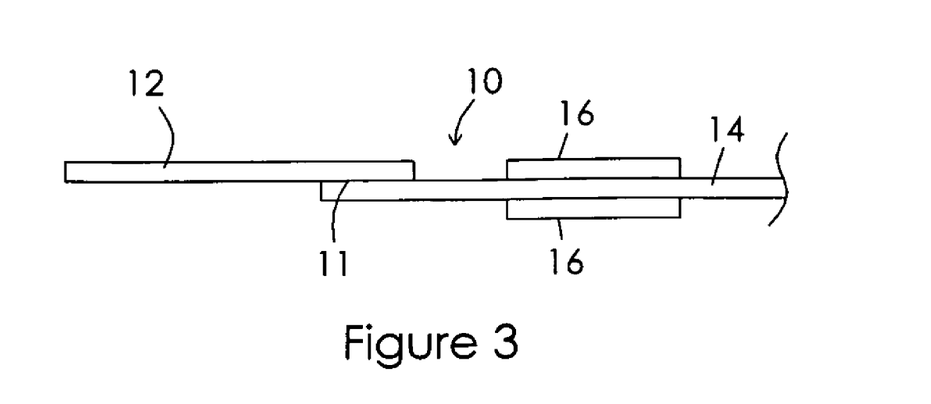
FIG. 3 is a cross-section of another embodiment of a tab assembly.

Although FIG. 1A through FIG. 2B illustrate an end of the weld material 12 being flush with an end of the tab 12, the weld material can extend beyond an end of the tab. For instance, FIG. 3 is a cross section of a tab assembly 10. An ultrasound weld attaches the weld material 12 to the tab such that the weld material extends beyond an end of the tab 14.

Figure 4A:
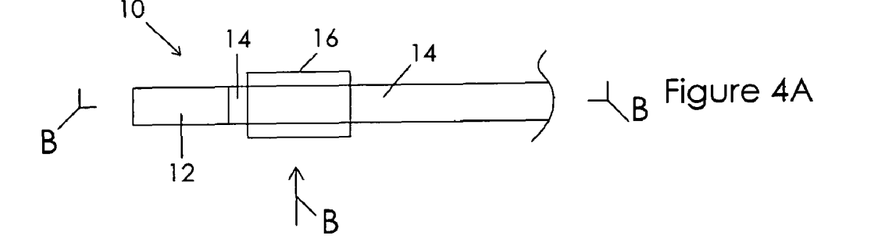
FIG. 4A is a sideview of the tab assembly.
Figure 4B:
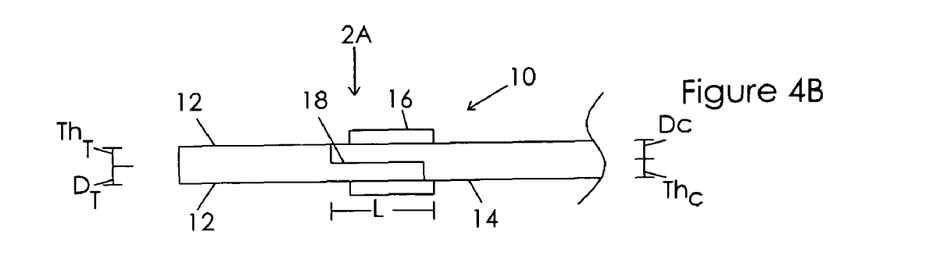
FIG. 4B is a cross-section of the tab assembly taken along a line extending between the brackets labeled B in FIG. 4A and taken looking in the direction of the arrow labeled B in FIG. 4A.

FIG. 4A and FIG. 4B provide another embodiment of a tab assembly 10. FIG. 4A is a sideview of the tab assembly 10. FIG. 4B is a cross-section of the tab assembly 10 taken along a line extending between the brackets labeled B in FIG. 1A and taken looking in the direction of the arrow labeled B in FIG. 1A. The sideview shown in FIG. 4B is taken looking in the direction of the arrow labeled A in FIG. 1A. The tab 14 and the weld material 12 each include a step 18. The steps are complementary. For instance, the length of the step, L, on the weld material 12 and tab 14 can be the same. When the length of the step 18 is the same, the step 18 of the weld material 12 can be positioned on the step 18 of tab 12 as shown in FIG. 4B. Additionally, the thickness of weld material step, $Th_C$, can be the same as the depth of the tab step, $D_T$. This arrangement permits the bottom of the tab assembly to be smooth where weld material meets the tab as illustrated in FIG. 4B. Additionally or alternately, the thickness of the tab step, $Th_T$, can be the same as the depth of weld material step, $D_T$. This arrangement permits the top of the tab assembly to be smooth where weld material meets tab as illustrated in FIG. 4B. Accordingly, one or both of the top and bottom of the tab assembly can be smooth where weld material meets the tab. As will become evident below, this smoothness may enhance the sealing between the tab assembly and the battery casing or pouch.

Figure 4C:
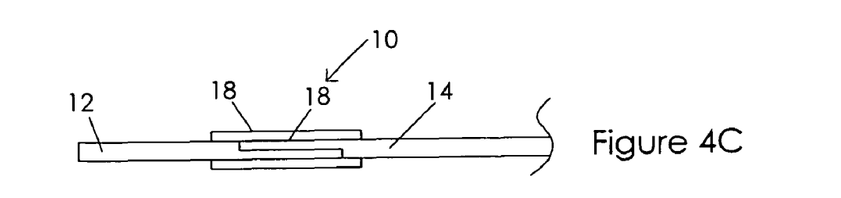
FIG. 4C is a cross-section of a tab assembly.

The sealing medium in FIG. 4A and FIG. 4B is positioned such that a portion of the tab and weld material are exposed on the side of the tab assembly that will not be positioned in the interior of an electrochemical device. However, the sealing medium is shown positioned such that no weld material is exposed on the side of the sealing medium that will be positioned in the interior of the electrochemical device. FIG. 4C illustrates the tab assembly of FIG. 4B with the sealing medium positioned such that neither weld material nor the tab are exposed on the side of the tab assembly that will not be positioned in the interior of an electrochemical device.

Although FIG. 4A through FIG. 4C illustrate the tab assembly having only one step at the interface of weld material and the tab, the tab assembly can include more than one steps and/or a slope at the interface of weld material and the tab.

The tab can be a conducting material such as a metal and can have a lightweight construction. For instance, the tab can be a metal foil such as an aluminum foil. Suitable foils have a thickness less than 0.2 mm, 0.5 mm or 2 mm. At least a portion of the tab that is attached to the weld material can have a thickness less than 0.5 mm, 2 mm and/or 8 mm. Additionally or alternately, the tab can be a low density/low cost material such as aluminum. The weld material is a material that is suitable for being ultrasound welded to the tab. Additionally, the weld material 12 can be a conducting material to permit the flow of electrical current through the weld material 12. For instance, the weld material 12 can be a metal. The weld material can be a material that is denser and/or thicker than the tab. For instance, the weld material can be nickel, and/or stainless steel. Suitable materials for the weld material 12 include, but are not limited to, aluminum, nickel and Stainless Steel. Suitable materials for the tab 14 include, but are not limited to, Ni, Stainless Steel, Fe, Au, Ti, Cu, Cu—Nickel alloy and nickel alloys. In a preferred example, the weld material includes or consists of nickel and the tab includes or consists of aluminum.

Figure 5A:
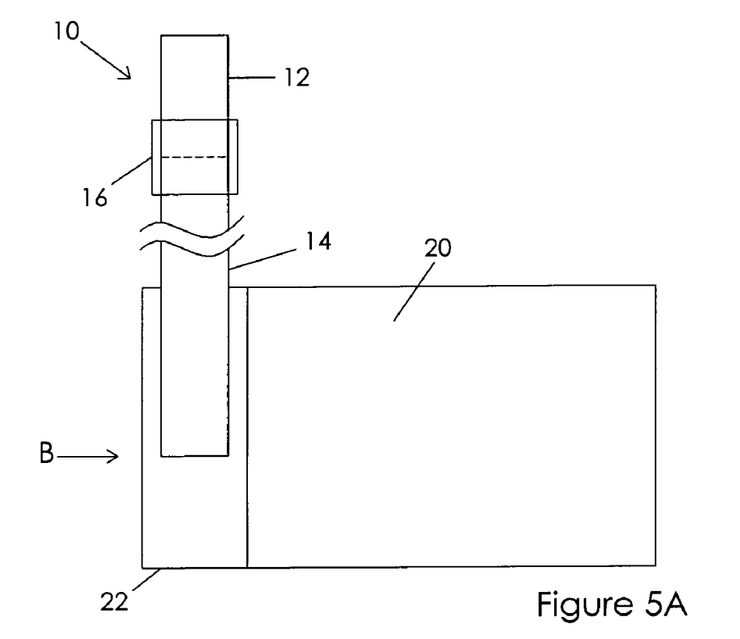
FIG. 5A is a side view of an electrode including the tab assembly of FIG. 1A and FIG. 1B.
Figure 5B:
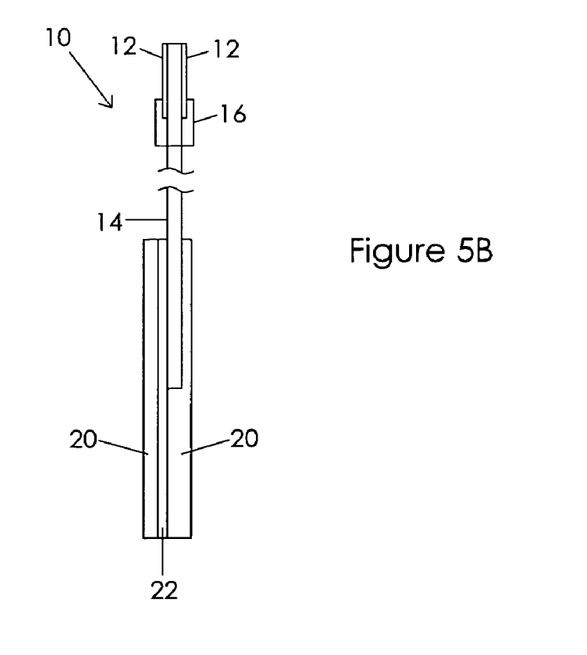
FIG. 5B is a sideview of the electrode shown in FIG. 5A taken looking in the direction of the arrow labeled B in FIG. 5A.

FIG. 5A is a side view of an electrode including the tab assembly 10 of FIG. 1A and FIG. 1B. FIG. 5B is a sideview of the electrode shown in FIG. 5A taken looking in the direction of the arrow labeled B in FIG. 5A. The electrode can be an anode or a cathode. The electrode includes an active material 20 positioned on a substrate body 22. Suitable materials for the substrate body 22 includes, but are not limited to, Ni, Al, and/or Stainless Steel particularly 30 series Stainless Steel. The tab 14 is connected to an exposed portion of the substrate body 22 that serves as the electrode tab. As will be evident below, an electrode tab can extend away from the substrate body 22. The tab 14 is often connected to the substrate body 22 using an ultrasonic weld or a laser weld. The material for the substrate body 22 can be the same or different from the material for the tab 14. Although the active material 20 is shown on both sides of the substrate body 22, the active material 20 can be positioned on only one side of the substrate body 22. The tab 14 can serve as a battery terminal or can be in electrical communication with a battery terminal.

Figure 5C:
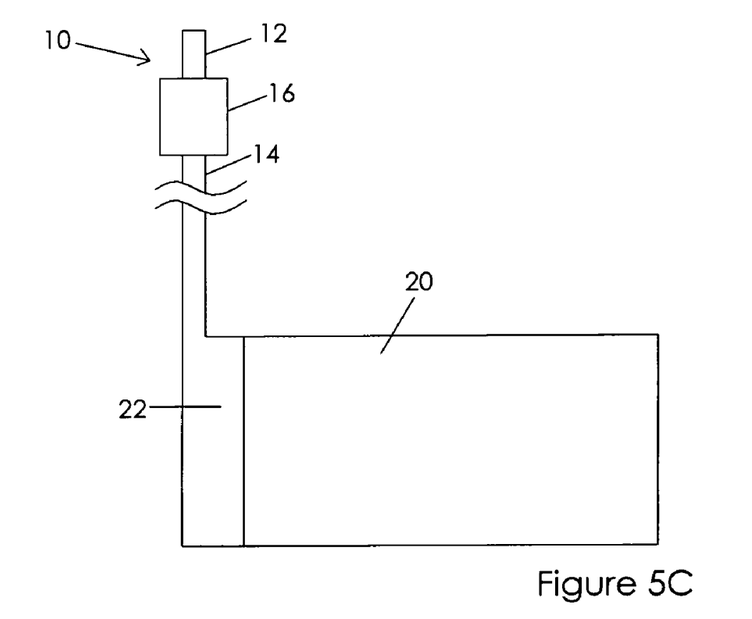
FIG. 5C is a sideview of an electrode having a substrate that is integral with a tab assembly.

Although FIG. 5A and FIG. 5B illustrate the tab 14 connected to the substrate body 22, the tab 14 can be integral with the substrate body 22 as illustrated in FIG. 5C. Although FIG. 5A and FIG. 5B are illustrated as employing a tab assembly constructed according to FIG. 1A and FIG. 1B, the tab assembly of FIG. 4A through FIG. 4C can be employed.

In some instances, the substrate body 22 also serves as the active material 20 are the same. For instance, the substrate body 22 can be lithium metal which can also serve as the active material 20. As a result, the electrode need not include a separate active material 20 on the substrate body 22.

Figure 6A:
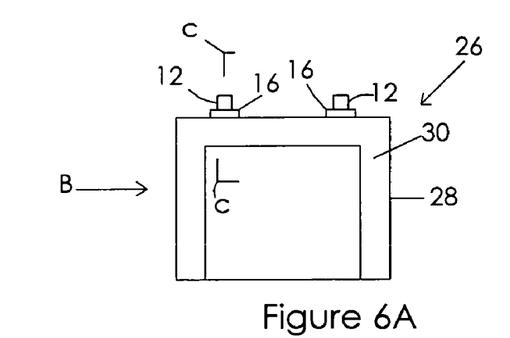
FIG. 6A is a sideview of the pouch cell.
Figure 6B:
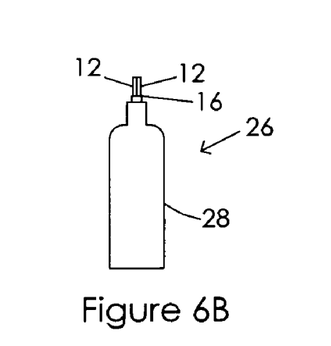
FIG. 6B is a side view of the pouch cell shown in FIG. 6A taken looking in the direction of the arrow labeled B.
Figure 6C:
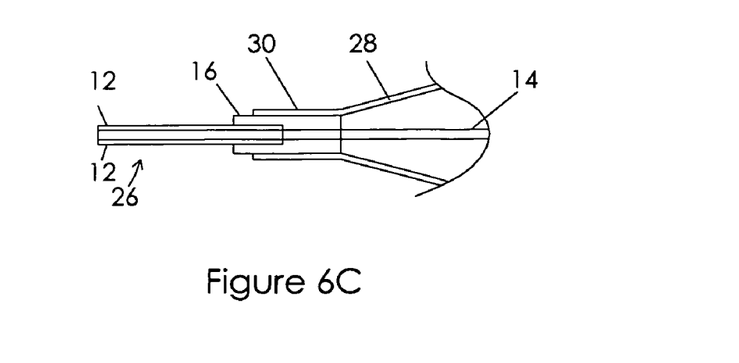
FIG. 6C is a cross section of the pouch cell shown in FIG. 6A taken looking along a line extending between the brackets labeled C and in the direction of the arrow labeled B in FIG. 6A.

Electrodes that include the tab assembly 10 can be employed in conjunction with a variety of battery constructions. For instance, the electrode can be employed in a pouch cell or a pouch battery. FIG. 6A is a sideview of a pouch cell 26. FIG. 6B is a side view of the pouch cell 26 shown in FIG. 6A taken looking in the direction of the arrow labeled B. FIG. 6C is a cross section of the pouch cell 26 shown in FIG. 6A taken looking along a line extending between the brackets labeled C and in the direction of the arrow labeled B in FIG. 6A. The pouch cell 26 includes electrodes positioned in a pouch 28 which serves as the battery casing. Suitable materials for the pouch include, but are not limited to, aluminum. Although not illustrated, a separator is positioned between adjacent pairs of anodes and cathodes. The pouch can be formed from a flap of material with a sealed region 30 at the perimeter. A tab 14 connected to one or more anodes extends through the sealed region 30. At least a portion of the sealing medium 16 is positioned in the sealed region 30 such that the sealing medium 16 seals the regions of the pouch adjacent to the tabs 14 such that an electrolyte in the pouch does not pass between the tab and the pouch. Although all of the weld material 12 on a tab 14 can be outside of the pouch, at least a portion of the weld material 12 is preferably positioned in the pouch as is evident in FIG. 6C. In some instances, positioning at least a portion of the weld material 12 in the pouch is desirable because having the entire tab outside of the pouch can result in a weak tab.

Figure 6D:
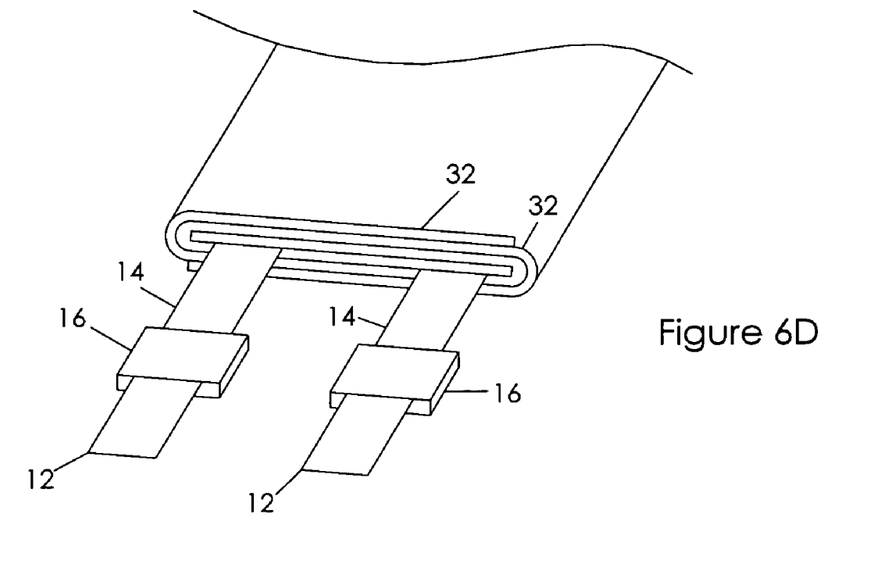
FIG. 6D illustrates a wound arrangement of electrodes suitable for use in a pouch cell.

The electrodes can be stacked or wound in the pouch. For instance, FIG. 6D illustrates a wound arrangement of the electrodes 32 suitable for use in the pouch cell 26 of FIG. 6A through FIG. 6C. One of the electrodes 32 serves as an anode and one of the electrodes serves as a cathode. A different tab 14 is in electrical communication with each of the electrodes. Although not illustrated, a separator is positioned between the anode and the cathode. Although only two electrodes 32 are illustrated in the wound arrangement, more than two electrodes 32 can be wound together.

Figure 6E:
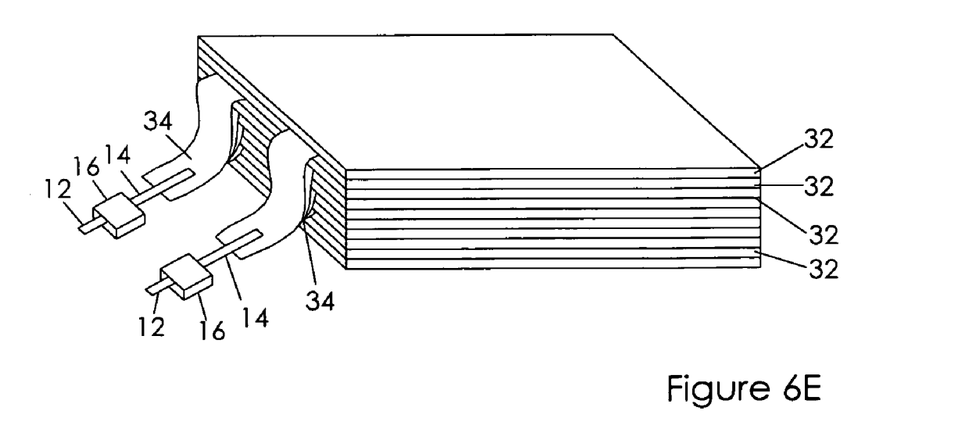
FIG. 6E illustrates a stacked arrangement of electrodes suitable for use in a pouch cell.

FIG. 6E illustrates a stacked arrangement of the electrodes 32 suitable for use in the pouch cell 26 of FIG. 6A through FIG. 6C. In the stack, anodes are alternated with cathodes. Although not illustrated, a separator is positioned between adjacent anodes and cathodes. The electrodes 32 each include an electrode tab 34 that extends outward from the substrate body 22. The electrode tabs 34 are in electrical communication with one another and with a tab 14. Accordingly, a different tab 14 is in electrical communication with the anodes than is in electrical communication with the cathodes. The stack can include only two electrodes 32. Accordingly, each tab 14 can be in electrical communication with a single electrode.

Pouch cells can be used in a variety of different applications. A suitable application for the pouch cells is illustrated in U.S. patent application Ser. No. 11/269,285, filed on Nov. 8, 2005, entitled "Modular Battery Pack," and incorporated herein in its entirety. Although the tab 14 is illustrated in conjunction with a pouch cell, the tab 14 structure can be used in conjunction with other battery structures.

Although FIG. 6A through FIG. 6E are illustrated as employing a tab assembly constructed according to FIG. 1A and FIG. 1B, the tab assembly of FIG. 4A through FIG. 4C can be employed.

A tab assembly can be constructed by employing ultrasound welding to attach the weld material to a tab as shown above. For instance, the weld material can be positioned in contact with the tab at the desired location. An ultrasound horn can be contacted to the tab and/or the weld material so as to create pressure at the interface between the weld material and the tab. The ultrasound horn can then be activated so as to apply ultrasound energy to the tab and/or the weld material. The ultrasound impact energy travels through the tab and/or the weld material to the interface of the tab and the weld material so as to melt the tab and/or the weld material. The delivery of the ultrasound energy can be stopped, slowed, and/or applied elsewhere so as to permit the molten materials to solidify and form the ultrasonic weld. During the solidification of the molten materials, pressure can be applied to the tab and weld material. The pressure applied during the solidification can be the same or different from pressure applied during application of the ultrasound energy. A suitable frequency ultrasound for bonding the weld material and the tab includes but is not limited to, 20-40 kHz.

When an active material is to be formed on the substrate body, the weld material is preferably attached to the tab before the active material is formed on the substrate body. This sequence prevents the ultrasound welding process from interfering with the integrity of the active material on the substrate body.

The battery can be a primary battery or a secondary battery. Further, the above electrode and tab constructions can be employed in other electrochemical devices such as capacitors and hybrid capacitors/batteries.

Many of the illustrations and discussions above are disclosed using the tab assembly disclosed in FIG. 1A and FIG. 1B, however, the illustrated methods, devices can employ the tab assembly of FIG. 4A through FIG. 4C.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A electrochemical device, comprising:
   one or more electrodes in electrical communication with a tab assembly, the tab assembly including an ultrasonic weld bonding a weld material to a tab that extends from an electrode, the weld material being in electrical communication with the electrode through the tab;
   the electrode being positioned in a case with the tab extending through the case; and
   a sealing medium sealing the tab to the case,
      the weld medium extending from a first location to a second location without extending past the sealing medium,
      the first location being outside of the case and the second location being between the tab and the sealing medium.

2. The electrochemical device of claim 1, wherein a second weld is positioned on a side of the tab opposite from the weld material, the tab assembly including an ultrasonic weld bonding the second weld material to the tab,
   the second weld medium extending from a third location to a fourth location without extending past the sealing medium,
   the third first location being outside of the case and the fourth location being between the tab and the sealing medium.

3. The electrochemical device of claim 1, wherein the weld material extends from a position on the tab that is furthest from the electrode toward the electrode.

4. The electrochemical device of claim 3, wherein the weld material extends beyond an end of the tab.

5. The electrochemical device of claim 1, wherein the electrode includes a substrate body and the tab is welded to the substrate body such that the tab extends from the substrate body to the weld material.

6. The electrochemical device of claim 1, wherein the electrode includes a substrate body and the tab is integral with the substrate body.

7. The electrochemical device of claim 1, wherein the weld material covers only a portion of the tab.

8. The electrochemical device of claim 1, wherein the tab includes aluminum and the weld material includes one or more components selected from a group consisting of Nickel and Stainless Steel.

9. The electrochemical device of claim 1, wherein the tab is a metal tab.

10. The electrochemical device of claim 1, wherein the tab and weld material each include one or more complementary steps at an interface of weld material and the tab.

11. The electrochemical device of claim 10, wherein the tab and weld material are flush where the weld material meets the tab at one or more surfaces selected from a group consisting of an upper surface of the tab assembly and a lower surface of the tab assembly.

12. The electrochemical device of claim 1, wherein at least a portion of the tab that is attached to the weld material has a thickness less than 8 mm.

13. The electrochemical device of claim 1, wherein the tab is a metal foil.

14. A method of generating an electrochemical device, comprising:
ultrasound welding a weld material to a tab; and
positioning an electrode in a case, the electrode being attached to the tab; and
sealing the case such that a sealing medium seals the tab to the case with the weld medium extending from a first location to a second location without extending past the sealing medium,
the first location being outside of the case and the second location being between the tab and the sealing medium.

15. The method of claim 14, wherein the weld material extends from a position on the tab that is furthest from the electrode toward the electrode.

16. The method of claim 14, wherein the weld material extends beyond an end of the tab.

17. The method of claim 14, wherein the electrode includes a substrate body and the tab is welded to the substrate body such that the tab extends from the substrate body to the weld material.

18. The method of claim 14, wherein the electrode includes a substrate body and the tab is integral with the substrate body.

19. The method of claim 14, wherein the tab includes aluminum and the weld material includes one or more components selected from a group consisting of Nickel and Stainless Steel.

20. The method of claim 14, wherein at least a portion of the tab that is attached to the weld material has a thickness less than 8 mm.

21. The method of claim 14, wherein the tab is a metal foil.

22. The method of claim 14, wherein the sealing medium seals the tab to the case such that an electrolyte in the case cannot pass between the tab and the case.

23. The method of claim 14, further comprising:
attaching the tab to one or more electrodes before positioning the tab in the case.

24. The method of claim 23, wherein attaching the tab to one or more electrodes includes welding the tab to a substrate body and an active material is positioned on the substrate body.

25. The electrochemical device of claim 1, wherein the case is a pouch formed from a flap of material with a perimeter of the material being sealed to itself at a perimeter of the pouch.

26. The method of claim 14, wherein the case is a pouch formed from a flap of material with a perimeter of the material being sealed to itself at a perimeter of the pouch.

27. The electrochemical device of claim 1, wherein the entire weld material is positioned outside of the case.

28. The method of claim 14, wherein the entire weld material is positioned outside of the case.

29. The electrochemical device of claim 1, wherein the entire weld material is thicker than the tab.

30. The electrochemical device of claim 29, wherein the entire weld material is denser than the tab.

31. The electrochemical device of claim 1, wherein the weld material is not directly ultrasound welded to a second tab that is in electrical communication with a second electrode.

32. The electrochemical device of claim 1, wherein the entire weld material is denser than the tab.

33. The electrochemical device of claim 1, wherein the first location is not between the sealing medium and the tab.

* * * * *